Dec. 29, 1925.
H. W. WILLIAMS
1,567,825
DISPENSING APPARATUS
Filed July 23, 1921  4 Sheets-Sheet 3
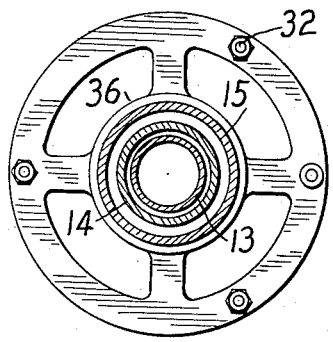
Fig. 3.
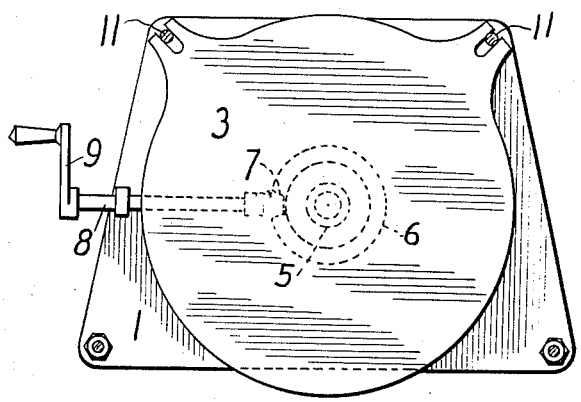
Fig. 4.
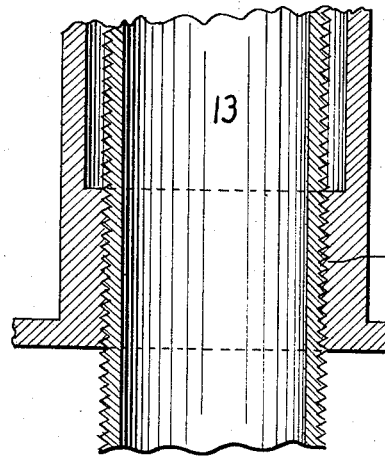
Fig. 5.
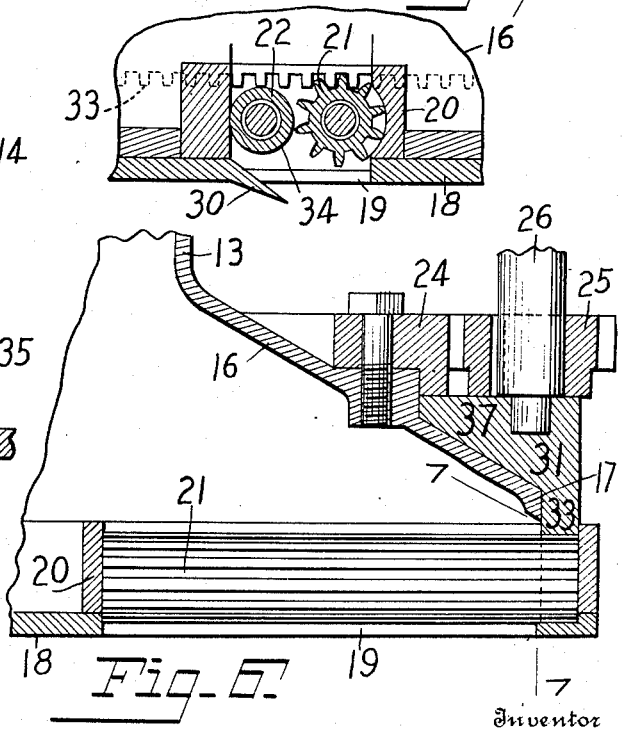
Fig. 7.
Fig. 6.
Inventor
H. W. WILLIAMS.
By Edward Reid
Attorney Dec. 29, 1925.  
H. W. WILLIAMS  
1,567,825  
DISPENSING APPARATUS  
Filed July 23, 1921   4 Sheets-Sheet 4
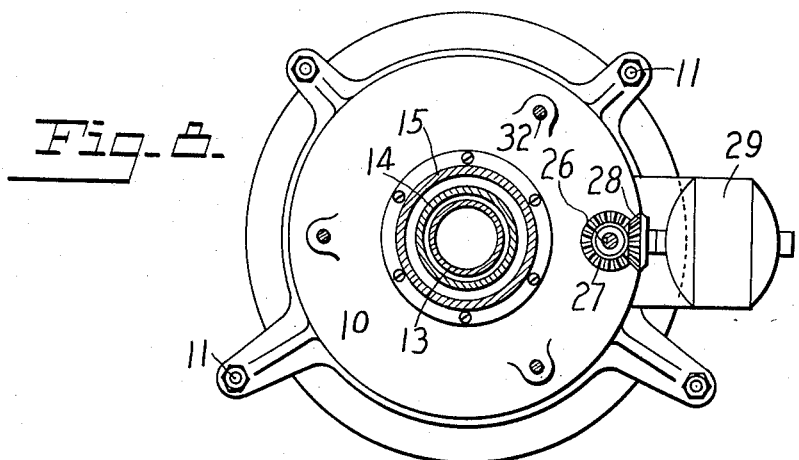
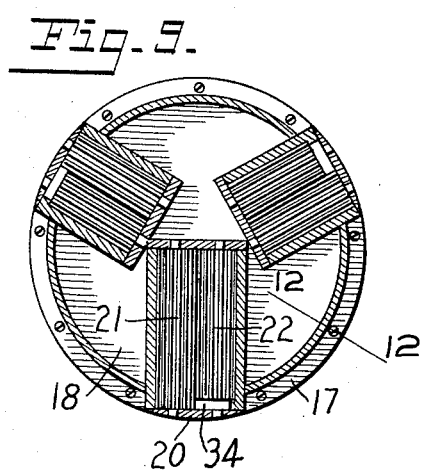
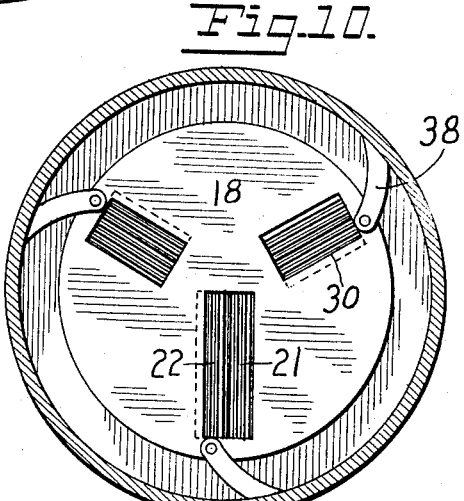
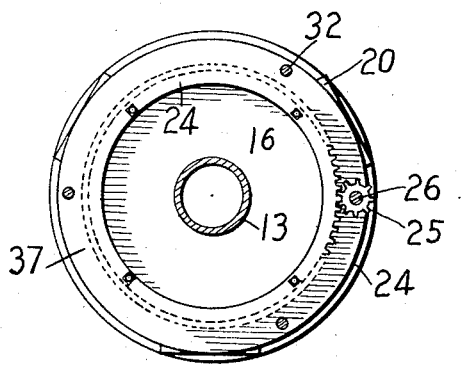
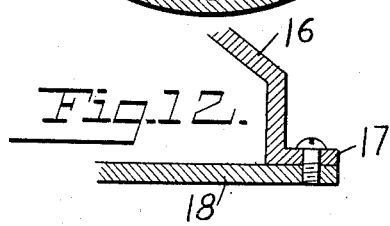
Inventor  
H. W. WILLIAMS.

Patented Dec. 29, 1925.

1,567,825

UNITED STATES PATENT OFFICE.

HARRY W. WILLIAMS, OF DAYTON, OHIO, ASSIGNOR TO CHARLES F. GARDNER, OF DAYTON, OHIO.

DISPENSING APPARATUS.

Application filed July 23, 1921. Serial No. 487,123.

*To all whom it may concern:*

Be it known that I, HARRY W. WILLIAMS, a citizen of the United States, residing at Dayton, in the county of Montgomery and State of Ohio, have invented certain new and useful Improvements in Dispensing Apparatus, of which the following is a specification, reference being had therein to the accompanying drawing.

This invention relates to a dispensing apparatus for delivering materials or commodities from the containers in which they are packed. While the present apparatus has been designed primarily for handling semi-solid, or plastic, materials, such as lard, greases, ice-cream, and the like, it will be apparent that the apparatus may be used with little or no modification for dispensing materials of various kinds.

One object of the invention is to provide an apparatus of this kind which will be simple in its construction and operation and which can be easily applied to a container and operated.

A further object of the invention is to provide such an apparatus in which the container will remain stationary during the removal of its contents.

A further object of the invention is to provide such an apparatus in which the discharge device will rotate about an axis extending lengthwise of the container to cause the operative parts thereof to be brought into operative relation to the various portions of the surface of the material in the container.

Other objects of the invention will appear as the apparatus is described in detail.

Figure 1:
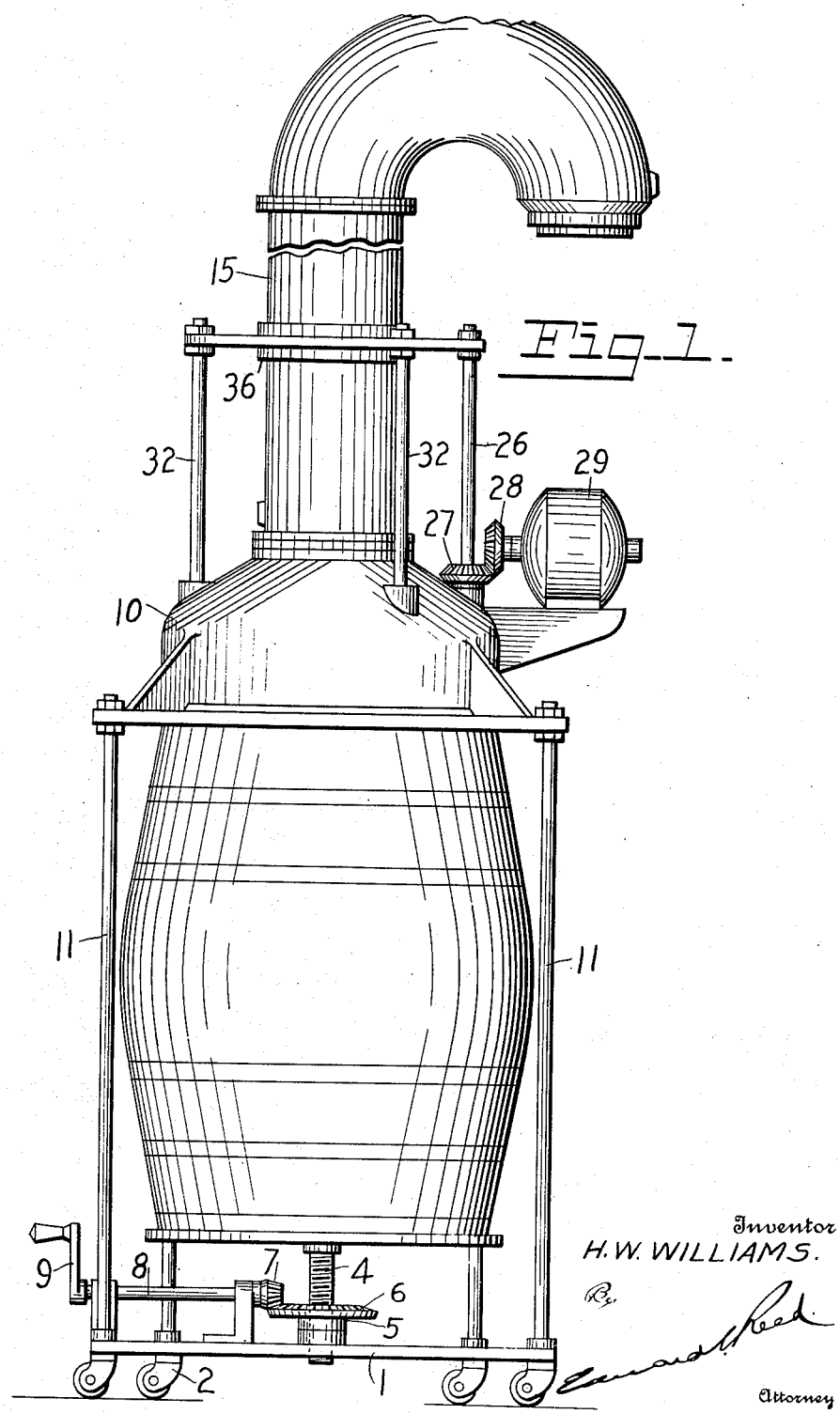
Figure 2:
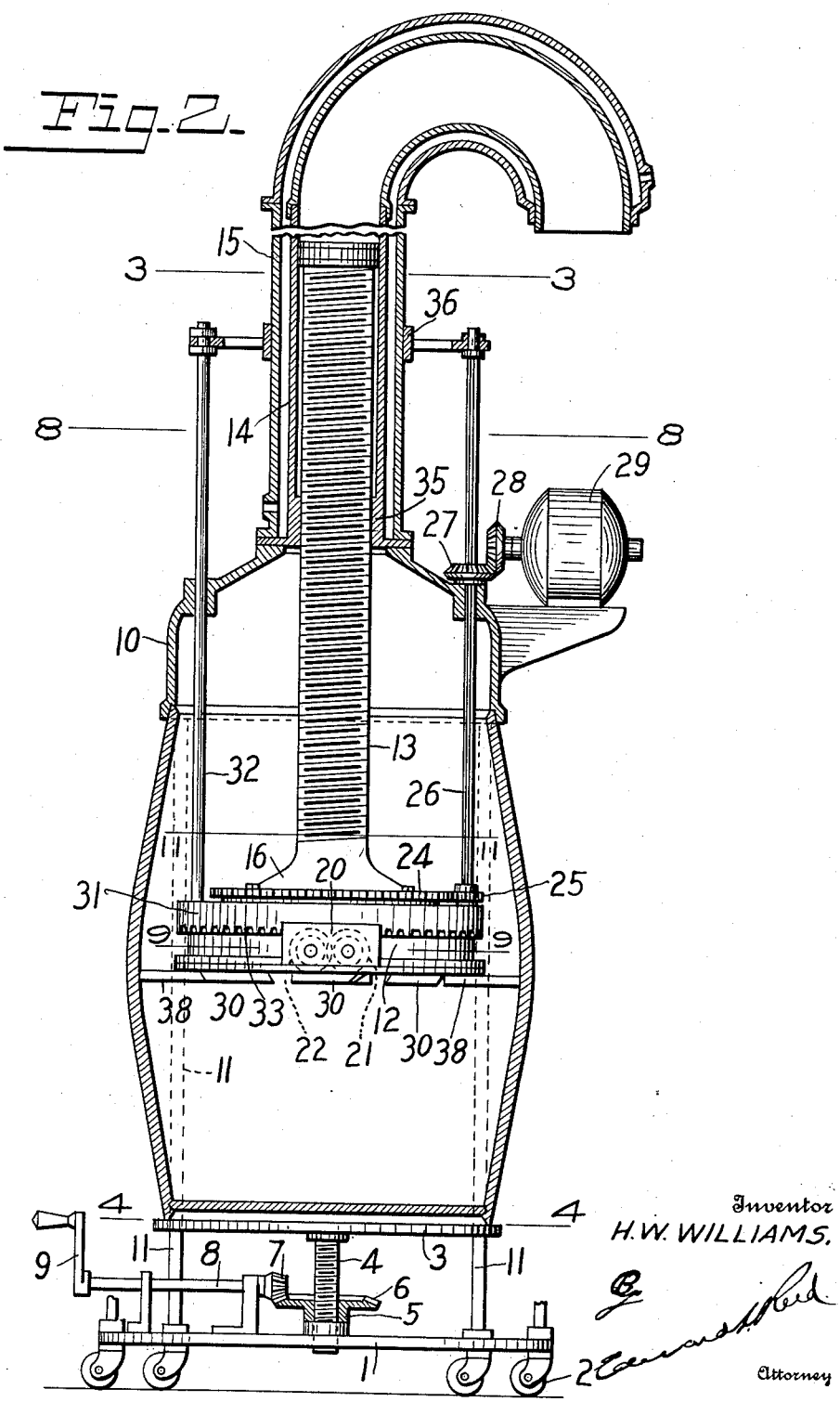

In the accompanying drawings Fig. 1 is a side elevation of an apparatus embodying my invention; Fig. 2 is a vertical sectional view taken through such an apparatus; Fig. 3 is a section taken on the line 3—3 of Fig. 2; Fig. 4 is a section taken on the line 4—4 of Fig. 2; Fig. 5 is a vertical sectional view taken through a portion of the discharge tube showing the screw and nut construction for advancing the discharge device; Fig. 6 is a vertical sectional view taken through one side of the discharge device; Fig. 7 is a transverse sectional view taken on the line 7—7 of Fig. 6; Fig. 8 is a section taken on the line 8—8 of Fig. 2; Fig. 9 is a transverse sectional view taken through the discharge device on the line 9—9 of Fig. 2; Fig. 10 is a bottom plan view of the discharge device; Fig. 11 is a transverse sectional view taken on the line 11—11 of Fig. 2 showing the discharge device in plan; and Fig. 12 is a section taken on the line 12—12 of Fig. 9.

In these drawings I have illustrated one embodiment of my invention and have shown the same as comprising a support on which the container is mounted and a frame, or supporting structure, arranged above the position occupied by the container and carrying the discharge mechanism. The container, after being placed in position, remains stationary and movement is imparted to the discharge device to cause it to come into operative relation with various portions of the surface of the material in the container, and to cause it to move toward the bottom of the container as the material is discharged therefrom. It will be understood, however, that the particular apparatus here shown has been chosen for the purpose of illustration only and that various modifications may be made therein without departing from the spirit of the invention.

The apparatus here shown comprises a base 1 which may, if desired, be mounted on castors 2 and which carries the container. In the present instance means are provided for adjusting the container vertically to properly position the same with relation to the superstructure which carries the discharge device and, as here shown, a supporting member, or platform, 3 is mounted on the base 1 and is vertically adjustable relatively thereto, this adjustment being accomplished by mounting the platform, or supporting member, 3 upon a standard 4 which is screw threaded into the hub 5, of a beveled gear, 6, the hub thus constituting a nut for the screw. Meshing with the beveled gear 6 is a beveled pinion 7 mounted on a shaft 8 which extends laterally beyond the platform and is provided with means for rotating the same, such as a crank or a handle 9. It will be apparent, therefore, that a limited vertical adjustment of the container may be made after it is placed in position on the support, but after this adjustment is accomplished the container will remain stationary. The frame, or superstructure, which carries the discharge device may take various forms and in the present instance it also constitutes a closure for the upper end of the container. As here shown, this superstructure comprises a bell shaped cap, or dome, 10, the lower edge of which is adapted to fit snugly about the upper edge of the container and which is rigidly connected to the base 1 by means of vertical rods 11, these rods being spaced apart at one side of the machine a distance sufficient to permit the container to be inserted between them when it is placed upon the platform 3. Two of these rods also serve as guides for the platform 3 and, further, serve to hold the platform against any tendency to rotate with the nut when vertical adjustment is imparted thereto, as shown in Fig. 4.

The discharge apparatus, which is shown as a whole at 12 in Fig. 2, is supported at the lower end of a discharge tube 13 which extends through the upper end of the superstructure, or cap, 10, and is arranged to deliver material at a suitable point outside of the container. In the present machine the discharge device is moved downwardly to cause it to follow the level of the material in the container and I have, therefore, shown the discharge tube as comprising two telescoping portions, the inner portion, 13 extending into and being movable relatively to the outer portion 14 which is mounted on and rigidly secured to the superstructure 10. This outer portion of the discharge tube, as here shown, has its upper end curved so that the discharge mouth thereof extends downwardly, thus permitting the material to be discharged into a suitable receptacle or measuring cup. This outer portion of the discharge tube is shown as enclosed in a water jacket 15 to maintain the material therein at a uniform temperature.

The discharge device may take various forms and may be provided with any suitable mechanism for removing the material and discharging it through the tube 13 but, as here shown, the lower end of the discharge tube 13 has secured thereto and, if desired, formed integral therewith, a flared head, or bell shaped mouth, 16 having at its lower edge a flange 17 to which is rigidly secured a bottom plate 18 having therein one or more openings 19 to permit the material to pass through the same. Mounted within the casing thus formed by the head 16 and bottom plate 18 is the mechanism for engaging and lifting the material. There may be one or more sets of devices for this purpose and in the present instance I have shown three, although the number may be varied at will. In the particular construction here illustrated each of these devices comprises a housing 20 arranged radially of the casing and having mounted therein two elongated intermeshing gears 21 and 22, which act upon the material after the manner of a gear pump to lift the same from the container and force it through the discharge tube 13. In order that at least one of these devices may act upon the material at the center of the container I have shown two of the housings 20 as of relatively short length and as spaced away from the center of the casing so that the third housing may extend between the inner ends thereof to a point adjacent to the center of the casing. This arrangement also has the advantage of placing the additional feeding devices nearer the outer periphery of the container from which, because of its greater circumference, the greater portion of the material must be removed.

The discharge device as a whole is rotated about a vertical axis to cause the several feeding devices to move over and come into contact with the different portions of the surface of the material and to this end I have rigidly secured to the discharge head 16 an annular gear, 24, which meshes with a pinion 25 secured to the lower end of the shaft 26 which is journaled in bearings in non-rotatable parts of the structure and extends upwardly through the superstructure 10 and is provided above that superstructure with a beveled pinion 27 which meshes with a similar pinion 28 on the shaft of a motor 29. In the present construction the lower end of the shaft 26 is journaled in a stationary ring, or annular frame, 31 which is secured to the lower ends of rods 32 which extend through the superstructure 10 and hold the ring 31 against rotation. The pinion 27 is splined onto the shaft 26 to cause the two parts to rotate together but to permit the shaft to have longitudinal movement relatively to the pinion. As the discharge device rotates the material is engaged by a scoop, or inclined plate, 30, projecting from the rear edge of each opening 19, which serves to force the same through the opening 19 into contact with the gears 21 and 22. Rotation may be imparted to the gears in various ways but, as here shown, I have utilized the stationary annular frame 31 for this purpose and to this end the frame 31 has its lower edge toothed, as shown at 33, to provide an annular rack which is arranged to mesh with the outer portions of the gears 21 of the feeding device. Consequently the rotation of the discharge device relatively to the stationary frame will cause the gears 21 to travel along the rack 33 and to be rotated thereby. It will be noted that the ends of the housings 20 extend beyond the side wall of the head 16 and have their upper walls cut away to permit the rack 33 to engage the gear. The outer end of the gear 22 of each feeding device has the teeth removed therefrom, as shown at 34, so that this gear will not engage the rack. Consequently, the gear 21 will be rotated by the rack when the discharge device as a whole is rotated and this rotary movement will be imparted by the gear 21 to the gear 22, thus causing the two gears to act upon the material in the container and force the same through the head 16 into the discharge tube 13.

Vertical movement may be imparted to the discharge device as a whole, to cause it to follow the level of the material in the container, in any suitable manner but I prefer to utilize the rotary movement of the discharge device for this purpose and I have, therefore, shown the inner portion 13 of the discharge tube as screw threaded into the outer portion 14 of that tube, said outer portion having at its inner end a part 35 forming a nut. Inasmuch as the outer portion of the tube is held against rotation it will be apparent that the rotation imparted to the inner portion 13 of the tube will cause longitudinal movement to be imparted thereto, thus imparting similar movement to the discharge device as a whole. As has been stated the fixed ring, or rack, 31 is rigidly secured to the lower end of the rods 32 and in order that this ring may move vertically with the discharge device these rods are slidably mounted in the superstructure, or cap, 10 and, if desired, may be connected at their outer ends with a ring, or guide collar, 36 slidably mounted on the outer portion of the discharge tube. To prevent the displacement of the ring 31 relatively to the gears I have shown the same as resting upon the casing 16 and as having a portion 37 extending beneath the annular gear 24. This arrangement permits the discharge device as a whole to rotate within the ring, or annular rack, 31 and holds the parts against relative vertical movement.

To enable the discharge device to remove all the material from containers of different diameters, and, further, to enable the same to accommodate itself to containers, the walls of which are curved, or tapered, such as the barrel shown in the present drawings, I have provided the discharge device with a plurality of scrapers 38 which are pivotally mounted on the discharge devices, preferably beneath the bottom plate 18 at the ends of the feeding devices and are so arranged that their outer ends will be forced by their contact with the material into engagement with the outer wall of the container, thus scraping the material therefrom and forcing it inward beneath the feeding devices by which it is removed. The arrangement of these scrapers is such that they will automatically accommodate themselves to the varying diameters of a non-cylindrical container.

The operation of the apparatus will be readily understood from the foregoing description of the several parts thereof and it will be apparent that when the apparatus is to be used the discharge device is moved upwardly into the superstructure or closure 10. The barrel, or other container, is placed upon the platform 3, and this platform elevated to bring the upper edge of the container into proper relation to the closure. The motor 29 is then started and operating through the pinion 27, shaft 26, pinion 25, and annular rack 24 imparts rotatory movement to the discharge device, rotating the screw threaded tube 13 in a direction to lower the discharge device and thus bring the lower surface of the same into contact with the material in the container. The rotation of the discharge device causes the longer gear of each gear pump, which is in mesh with the stationary rack 33, to travel along that rack and to be rotated thereby, thus operating the several gear pumps to lift the material from the container into the discharge device and force the same thence through the outlet tube. It will also be apparent that I have provided a device of this kind which is not only simple in its construction and operation but will operate to remove all the material from containers of various kinds. Further, it will be apparent that it is not necessary to impart any movement to the container itself but that one or both of the relative movements necessary to cause the material to be removed are imparted to the discharge device, that is, the discharge device is rotated to cause it to act upon all parts of the surface of the material and it may be moved downwardly to maintain it in contact with the material.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In an apparatus of the character described, a support for a container, a superstructure carried by said support and spaced above the same, a discharge device mounted on said superstructure and adapted to extend into a container on said support and to separate material from the mass of material therein, means to convey the separated material from said container, and means for rotating said discharge device about an axis extending lengthwise of said container.

2. In an apparatus of the character described, a support for a container, a superstructure carried by said support and spaced above the same, a discharge device mounted on said superstructure and adapted to extend into a container on said support and to separate material from the mass of material therein, means to convey the separated material from said container, and means for rotating said discharge device about an axis extending lengthwise of said container and for causing said discharge device to move toward the bottom of said container.

3. In an apparatus of the character described, a discharge conduit adapted to extend into a container, a discharge device communicating with the inner end of said conduit, mounted for bodily movement with relation to said container and comprising a feeding device movable relatively thereto and serving to separate material from a mass of material in said container and deliver the same to said conduit, and means for actuating said discharge device to move said feeding device bodily over the material in said container and for actuating said feeding device.

4. In an apparatus of the character described, a discharge conduit adapted to extend into a container, a discharge device communicating with the inner end of said conduit, mounted for bodily movement with relation to said container and comprising a feeding device movable relatively thereto and serving to separate material from a mass of material in said container and deliver the same to said conduit, means for actuating said discharge device to move said feeding device bodily over the material in said container and for actuating said feeding device, and means to cause said discharge device to move toward the bottom of said container.

5. In an apparatus of the character described, a conduit adapted to extend into a container, a discharge device communicating with the inner end of said conduit and mounted for rotation about an axis extending lengthwise of said container, said discharge device comprising a feeding device movable relatively thereto and serving to separate material from a mass of material in said container and deliver the same to said conduit, and means for rotating said discharge device about said axis and for actuating said feeding device during the rotation of said discharge device.

6. In an apparatus of the character described, a rotatable discharge device adapted to extend into a container and comprising a tube and means for separating material from the mass of material in said container and delivering the same to said tube, a non-rotatable member supported adjacent to the inner end of said discharge device, and means associated with said non-rotatable member for rotating said discharge device.

7. In an apparatus of the character described, a rotatable discharge device adapted to extend into a container and comprising a tube and means for separating material from the mass of material in said container and delivering the same to said tube, a non-rotatable member supported adjacent to the inner end of said discharge device, means associated with said non-rotatable member for rotating said discharge device and means for moving said discharge device and said non-rotatable member toward the bottom of said container.

8. In an apparatus of the character described, a discharge device adapted to extend into a container and to remove material therefrom, an annular gear carried by the inner end of said discharge device, a shaft extending into said container alongside of said discharge device, a pinion carried by said shaft and meshing with said annular gear, and means for rotating said shaft.

9. In an apparatus of the character described, a discharge conduit adapted to extend into a container, a discharge device communicating with the inner end of said conduit and mounted for rotation with relation to said container, said discharge device comprising a feeding device movable relatively thereto and serving to separate material from a mass of material in said container and deliver the same to said conduit, a non-rotatable member supported near said discharge device, and means associated with said non-rotatable member to rotate said discharge device and to actuate said feeding devices.

10. In an apparatus of the character described, a support for a container, a superstructure arranged above the upper end of said container, a discharge tube extending through said superstructure into said container, a discharge device secured to the inner end of said discharge tube, an annular gear secured to said discharge device, a shaft mounted in said superstructure and arranged parallel to said discharge tube, a gear carried by said shaft and meshing with said annular gear, and means for rotating said shaft.

11. In an apparatus of the character described, a support for a container, a superstructure arranged above the upper end of said container, a discharge tube extending through said superstructure into said container, a discharge device secured to the inner end of said discharge tube, an annular gear secured to said discharge device, a shaft mounted in said superstructure and arranged parallel to said discharge tube, a gear carried by said shaft and meshing with said annular gear, means for rotating said shaft, and means for imparting longitudinal movement to said discharge tube to cause said discharge device to move toward the bottom of said container.

12. In an apparatus of the character described, a support for a container, a superstructure arranged above the position occupied by said container, a discharge tube comprising a portion fixed to said superstructure, a second portion screw threaded into said fixed portion and adapted to extend into the container on said support, a discharge device connected with the lower end of the last mentioned portion of said discharge tube, and means for rotating said discharge device and said last mentioned portion of said tube.

13. In an apparatus of the character described, a support for a container, a superstructure arranged above the position occupied by said container, a discharge tube carried by said superstructure and adapted to extend into a container on said support, a discharge device connected with the inner end of said tube, and comprising an actuating gear, means for rotating said discharge device about an axis extending lengthwise of said container and an annular rack extending about said discharge device, meshing with said actuating gear, and held against rotation.

14. In an apparatus of the character described, a support for a container, a superstructure arranged above the position occupied by said container, a discharge tube carried by said superstructure and adapted to extend into a container on said support, a discharge device connected with the inner end of said tube, and comprising an actuating gear, means for rotating said discharge device about an axis extending lengthwise of said container, and an annular rack extending about said discharge device, meshing with said actuating gear, and held against rotation, and means for imparting vertical movement to said discharge device and said annular rack.

15. In an apparatus of the character described, a support for a container, a superstructure arranged above the position occupied by said container, a discharge tube carried by said superstructure and adapted to extend into a container on said support, a discharge device connected with the inner end of said tube and comprising elongated, intermeshing gears to engage the material and feed the same to said tube, means for rotating said discharge device about an axis extending lengthwise of said container, and an annular rack extending about said discharge device, held against rotation, and meshing with one of said gears.

16. In an apparatus of the character described, a support for a container, a superstructure arranged above the position occupied by said container, a discharge tube carried by said superstructure and adapted to extend into a container on said support, a discharge device connected with the inner end of said tube and comprising a pair of elongated intermeshing gears to engage the material and feed the same to said discharge tube, an annular rack extending about said discharge device and meshing with one of said gears, rods mounted on said superstructure and connected with said annular rack to hold the same against rotation, an annular gear rigidly secured to said discharge device and overlapping a part of said annular rack to hold the same in operative engagement with said gear, a shaft mounted in said superstructure and journaled at its lower end in said annular rack, a gear carried by said shaft and meshing with said annular gear, and means for rotating said shaft.

17. In an apparatus of the character described, a support for a container, a superstructure arranged above the position occupied by said container, a discharge tube carried by said superstructure and adapted to extend into a container on said support, a discharge device connected with the inner end of said tube, and comprising a pair of elongated intermeshing gears to engage the material and feed the same to said discharge tube, an annular rack extending about said discharge device and meshing with one of said gears, rods mounted on said superstructure and connected with said annular rack to hold the same against rotation, an annular gear rigidly secured to said discharge device and overlapping a part of said annular rack to hold the same in operative engagement with said gear, a shaft mounted in said superstructure and journaled at its lower end in said annular rack, a gear carried by said shaft and meshing with said annular gear, and means for rotating said shaft, and means for moving said discharge device toward the bottom of said container as the material is discharged therefrom.

18. In an apparatus of the character described, a discharge device adapted to extend into a container and remove material therefrom, said discharge device comprising a plurality of feeding devices each arranged substantially radially thereof and capable of movement relatively thereto, and means for rotating said discharge device as a whole about an axis extending lengthwise of said container and for actuating said feeding devices.

19. In an apparatus of the character described, a support for a container, a discharge device adapted to extend into said container and remove material therefrom, said discharge device comprising a plurality of pairs of intermeshing gears arranged substantially radially thereof, the gears of one pair extending approximately to the center of said discharge device and the gears of the other pairs being of less length than the gears of the first mentioned pair, and means for rotating said discharge device as a whole and for actuating said gears.

20. In an apparatus of the character described, a discharge device adapted to extend into a container and comprising an operable feeding device to separate material from the mass of material in said container and means to convey the separated material from said container, means to rotate said discharge device and to operate said feeding device, and a scraper pivotally mounted on said discharge device and having its outer end arranged to engage the wall of said container to move the material into operative relation to said discharge device.

21. In an apparatus of the character described, a support for a container, a closure for the upper end of said container constituting a supporting structure, a discharge tube comprising an outer portion fixed on said closure and an inner portion screw threaded into the outer portion and adapted to extend into the container, a discharge device carried by the inner end of the last mentioned portion of said tube, an annular structure arranged about said discharge device and having teeth in one edge thereof, rods mounted in said closure to support said annular structure against rotation, said discharge device comprising an actuating gear meshing with the teeth of said annular structure, an annular gear rigidly secured to said discharge device, a shaft slidably mounted in said closure and supported at its lower end in said annular structure, a pinion carried by said shaft and meshing with said annular gear, and means for rotating said shaft.

22. In an apparatus of the character described, a support for a container, a stationary closure for the upper end of the container, said support comprising means for moving said container toward and from said closure, and a discharge device carried by said closure and adapted to extend into said container to remove the material therefrom.

23. In an apparatus of the character described, a support for a container, a stationary closure for the upper end of the container, said support comprising means for moving said container toward and from said closure, and a discharge device carried by said closure and adapted to extend into said container to remove the material therefrom, and means for rotating said discharge device and for moving the same toward the bottom of said container.

24. In an apparatus of the character described, a base, a platform adjustably mounted on said base and adapted to support a container, a stationary closure for said container arranged above said platform, and a discharge device carried by said closure and adapted to extend into the container.

25. In an apparatus of the character described, a base, a platform, a standard connecting said platform with said base and screw threaded into a nut, a gear connected with said nut, means for actuating said gear to impart longitudinal movement to said standard, a closure for the upper end of said container supported by said base at a fixed distance therefrom, a discharge device carried by said closure and adapted to extend into said container, and means for rotating said discharge device and moving the same toward the bottom of said container.

In testimony whereof I affix my signature hereto.

HARRY W. WILLIAMS.